(12) United States Patent
Nishijima et al.

(10) Patent No.: US 10,457,456 B2
(45) Date of Patent: Oct. 29, 2019

(54) SHEET MATERIAL AND BARRIER PACKAGING CONTAINER USING THE SAME, AND METHOD FOR FABRICATING THE SHEET MATERIAL

(71) Applicant: Toppan Printing Co., Ltd., Tokyo (JP)

(72) Inventors: Nao Nishijima, Tokyo (JP); Akira Isogai, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 279 days.

(21) Appl. No.: 14/995,472

(22) Filed: Jan. 14, 2016

(65) Prior Publication Data

US 2016/0130056 A1 May 12, 2016

Related U.S. Application Data

(63) Continuation of application No. PCT/JP2014/003777, filed on Jul. 16, 2014.

(30) Foreign Application Priority Data

Jul. 25, 2013 (JP) ................................. 2013-154571

(51) Int. Cl.
*B65D 65/42* (2006.01)
*B32B 5/24* (2006.01)
(Continued)

(52) U.S. Cl.
CPC .............. *B65D 65/42* (2013.01); *B32B 5/022* (2013.01); *B32B 5/024* (2013.01); *B32B 5/24* (2013.01);
(Continued)

(58) Field of Classification Search
CPC ........... B65D 65/42; B32B 5/245; B32B 5/26; B32B 5/022; B32B 5/024; B32B 5/24;
(Continued)

(56) References Cited

U.S. PATENT DOCUMENTS

2010/0316863 A1* 12/2010 Kumamoto .............. C08J 7/047
428/292.1
2013/0004687 A1 1/2013 Oomori et al.
(Continued)

FOREIGN PATENT DOCUMENTS

CN 101772516 A 7/2010
CN 202190599 U 4/2012
(Continued)

OTHER PUBLICATIONS

Extended European Search Report dated Mar. 20, 2017 in corresponding European Application No. 14829532.2.
(Continued)

*Primary Examiner* — Jeremy R Pierce
(74) *Attorney, Agent, or Firm* — Foley & Lardner LLP (57) ABSTRACT

A gas barrier sheet material which make effective use of natural resources and which has improved gas barrier properties including oxygen barrier properties, water vapor barrier properties and smell barrier properties, and improved flexibility; a barrier container using the same; and a method for fabricating a sheet material. A sheet material is characterized in that a fine fiber layer and a moisture-retaining layer are stacked on at least one surface of a substrate in such a way that the fine fiber layer and the moisture-retaining layer are in direct contact with each other. The invention is more advantageous when using a substrate, e.g. paper, a nonwoven fabric, or a porous membrane, of which surface profile is not flat and which is inherently susceptible to causing troubles in fabrication processes, such as of soaking, wetting and drying during coating of a coating agent.

7 Claims, 1 Drawing Sheet

(51) Int. Cl.
*B32B 5/26* (2006.01)
*B32B 29/02* (2006.01)
*B32B 5/02* (2006.01)
*B32B 27/12* (2006.01)

(52) U.S. Cl.
CPC ............... *B32B 5/245* (2013.01); *B32B 5/26* (2013.01); *B32B 27/12* (2013.01); *B32B 29/02* (2013.01); *B32B 2262/062* (2013.01); *B32B 2307/546* (2013.01); *B32B 2307/7242* (2013.01); *B32B 2307/7244* (2013.01); *B32B 2307/7246* (2013.01); *B32B 2307/7248* (2013.01); *B32B 2439/70* (2013.01); *B32B 2439/80* (2013.01)

(58) Field of Classification Search
CPC .............. B32B 27/12; B32B 2262/062; B32B 2307/546; B32B 2307/2307; B32B 2307/7242; B32B 2307/7244; B32B 2307/7246; B32B 2307/7248; B32B 2439/70; B32B 2439/80
See application file for complete search history.

(56) References Cited

U.S. PATENT DOCUMENTS

| | | | |
|---|---|---|---|
| 2013/0011663 | A1 | 1/2013 | Imai et al. |
| 2013/0017400 | A1* | 1/2013 | Imai .................. B32B 7/12 428/447 |
| 2013/0022827 | A1 | 1/2013 | Imai et al. |
| 2014/0017430 | A1 | 1/2014 | Kimura et al. |
| 2014/0234640 | A1* | 8/2014 | Kohno .................. B29C 41/24 428/452 |

FOREIGN PATENT DOCUMENTS

| | | | | |
|---|---|---|---|---|
| CN | 102811858 | A | 12/2012 | |
| CN | 102821949 | A | 12/2012 | |
| CN | 102834259 | A1 | 12/2012 | |
| JP | 2010-125814 | A | 6/2010 | |
| JP | 2011-195660 | A | 10/2011 | |
| JP | 2013-510222 | A | 3/2013 | |
| WO | WO-2011/118520 | A1 | 9/2011 | |
| WO | WO 2012/128107 | A1 | 9/2012 | |
| WO | WO-2013031687 | A1 * | 3/2013 | ............ B29C 41/24 |

OTHER PUBLICATIONS

International Search Report issued in PCT/JP2014/003777 dated Oct. 14, 2014.
Bi, Shi, "An Introduction to Processes of Light Chemical Industry," Chemical Industry Beijing, Jul. 2010, pp. 86-87.
Jianchun Zhang, "General Techniques of Use and Processes of Chinese Hemp Seeds," Chemical Industry Beijing, Dec. 2010, pp. 231-232.
Office Action issued in Corresponding CN patent application No. 2014800409609 dated Jul. 3, 2017.
Chinese Office Action issued in Application No. 201480040960.9 dated Nov. 1, 2016 with its English translation.
Office Action dated Jul. 3, 2017 in Chinese Patent Application No. 201480040960.9.
Chinese Office Action dated Jan. 19, 2018 in corresponding application No. 2014800409609.

* cited by examiner

SHEET MATERIAL AND BARRIER PACKAGING CONTAINER USING THE SAME, AND METHOD FOR FABRICATING THE SHEET MATERIAL

CROSS-REFERENCE TO RELATED PATENT APPLICATIONS

This application is a continuation application filed under 35 U.S.C. 111(a) claiming the benefit under 35 U.S.C. §§ 120 and 365(c) of PCT International Application No. PCT/JP2014/003777 filed on Jul. 16, 2014, which is based upon and claims the benefit of priority of Japanese Application No. 2013-154571, filed on Jul. 25, 2013, the entire contents of them all are hereby incorporated by reference.

TECHNICAL FIELD

This invention relates to a sheet material having gas barrier properties, which is used not only in the packaging field of foods, medical products, commodities and the like, but also for electronic members. More particularly, the invention relates to a sheet material having improved or even excellent gas barrier properties, which makes more effective use of natural resources so as to reduce an environmental burden and having improved or even excellent water vapor barrier properties and smell barrier properties, and a packaging container using the same, and also to a method for fabricating the sheet material.

BACKGROUND

Recently, packaging materials used in packaging have been required to have gas barrier properties enough to block, for example, oxygen, water vapor or other types of gases causing deterioration of a content from being passed through the packaging material so as to inhibit the deterioration of the content. Especially with foods, in order to inhibit the oxidation and deterioration such as of proteins, fats and oils and the like and keep their taste or freshness, it is necessary to prevent the influence of oxygen, water vapor or other types of gases acting to deteriorate the content on their passage through a packaging material of food. Thus, there has been required a packaging material having gas barrier properties sufficient to block these gases. With medical drugs needed to be handled under aseptic conditions, the influence of oxygen, water vapor and other types of gases acting to deteriorate the contents has to be prevented so as to suppress effective components from being deteriorated and keep their efficacies. Hence, packaging materials having gas barrier properties capable of blocking these gases have been required. Moreover, packaging materials having smell barrier properties have also been required for toiletry products, detergents and the like in association with diversified requirements for smell.

For barrier materials against oxygen and water vapor, there have been recently proposed a great number of barrier films wherein a nanoscale metal oxide film such as of silicon oxide or aluminum oxide is formed on a plastic substrate.

For the formation of such a metal oxide film on the surface of a plastic substrate (resin film), there are known, for example, methods making use of physical vapor deposition methods (PVD) including a vacuum film formation method, a sputtering method, an ion plating method and the like, or chemical vapor deposition methods (CVD) including a plasma chemical vapor deposition method, a thermochemical vapor deposition method, a photochemical vapor deposition method and the like.

Such barrier films as set out above are a kind of technology expected not only in the food package, but also widely in industrial applications from the standpoint that when comparing with existing barrier films using an aluminum foil, they have more improved or even excellent transparency and better barrier properties against oxygen and water vapor.

On the other hand, attention has been recently paid to the use of eco-friendly materials, which can be prepared in reduced amounts of fossil resources and can be treated at low energies when disposed along with a reduced discharge of carbon dioxide, in the context of the depletion of resources and the problems of warming induced by increased carbon dioxide in air, environmental pollution, and wastage. Under these circumstances, there has been expected the positive use of biomass resource-derived materials making use, partly or wholly as a starting material, of natural plants without use of starting fossil resources, or biodegradable materials that are decomposed into water and carbon dioxide in an environment. This is no exception in the packaging materials, and packaging substrates are actively being substituted from fossil resource-derived, synthetic materials to biomass resource-derived paper.

Further, there have been developed biomass-derived, gas barrier coating agents such as of polysaccharides including water-soluble starches and water-soluble cellulose derivatives. These are naturally derived and are thus improved or even excellent from the environmental and safety viewpoints. However, the coating materials of water-soluble polysaccharides are dependent on temperature and humidity, and deterioration of gas barrier properties under high humidity is unavoidable.

In order to solve these problems, a variety of attempts have been made. In Patent Literature 1, for example, it is described that gas barrier properties are developed by forming a cellulose nanofiber layer on a substrate and are improved by cross-linkage with inorganic compounds or by vacuum deposition of metal oxides. However, sheet materials having gas barrier properties have not been sufficiently investigated with respect to flexibility thereof, and it is thus assumed that flexibility is not adequate for practical applications associated with work and product design.

CITATION LIST

Patent Literature

Patent Literature 1: Japanese Patent Publication No. 2010-125814

SUMMARY OF THE INVENTION

Technical Problem

The present invention has been made in consideration of the above-stated technical background and has for its object the provision of a sheet material that makes effective use of natural resources, have improved or even excellent gas barrier properties including oxygen gas barrier properties, water vapor barrier properties and smell barrier properties, and have flexibility along with the gas barrier properties, and also of a barrier packaging container using the sheet material and a method for fabricating the sheet material.

Solution to Problem

As a measure for solving the above problem, an embodiment of the invention is directed to a sheet material, which is characterized by forming a fine fiber layer containing a humectant on at least one surface of a substrate.

Another embodiment of the invention is directed to a sheet material, which is characterized by stacking a fine fiber layer and a moisture-retaining layer on at least one surface of a substrate.

In the above sheet material, the fine fiber layer and the moisture-retaining layers can be in direct contact with each other.

In the above sheet material, the moisture-retaining layer and the nanofiber layer can be formed on the substrate in this order.

In the above sheet material, the fine fiber layer and the moisture-retaining layer can be formed on the substrate in this order.

In the above sheet material, the fine fiber layer can contain cellulose fibers.

In the above sheet material, the fine fiber layer can contain fine fibers having a width within a range of from 2 nm to 50 nm and a length within a range of from 0.2 µm to 50 µm.

In the above sheet material, the fine fiber layer can contain a plasticizer.

In the above sheet material, the substrate can be constituted of any of paper, a woven fabric, a non-woven fabric, and a porous membrane.

A further embodiment of the invention is directed to a barrier packaging container, characterized by fabricating by use of the sheet material.

A still further embodiment of the invention is directed to a method for fabricating the above-recited sheet material, characterized by comprising the steps of forming the fine fiber layer on at least one surface of the substrate by wet coating, and forming a deposition layer by vacuum deposition so as to cover the surface of the substrate, on which the fine fiber layer has been formed.

Advantageous Effect of Invention

According to the embodiment of the invention, the sheet material makes effective use of natural resources and having improved or even excellent gas barrier properties including oxygen barrier properties, water vapor barrier properties and smell barrier properties, and its flexibility can be improved.

DESCRIPTION OF REPRESENTATIVE EMBODIMENTS

The respective embodiments of the invention are now illustrated with reference to the accompanying drawings. It will be noted that in the respective drawings, like portions having the same configuration and the same function are indicated by like reference numerals. In the following detailed description, in order to provide better understanding of the embodiments of the invention, many specific details are described. However, it will become apparent that unless such details are described, one or more of the embodiments can be carried out. Besides, for convenience's sake of the drawings, known structures and devices are shown schematically.

Figure 1:
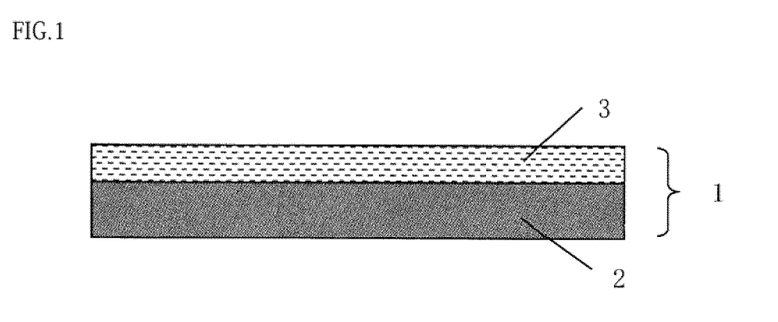
FIG. 1 is a schematic sectional view of a sheet material according to a first embodiment of the invention.

FIG. 1 is a schematic sectional view of a sheet material related to a first embodiment of the invention. A sheet material 1 shown in FIG. 1 is one wherein a fine fiber layer 3 containing a humectant is formed on at least one surface of a substrate. Some laminate may be formed between the substrate 2 and the fine fiber layer 3 containing a humectant. Additionally, some laminate may also be formed on a surface opposite to the surface of the substrate 2 on which the fine fiber layer has been formed.

Figure 2:
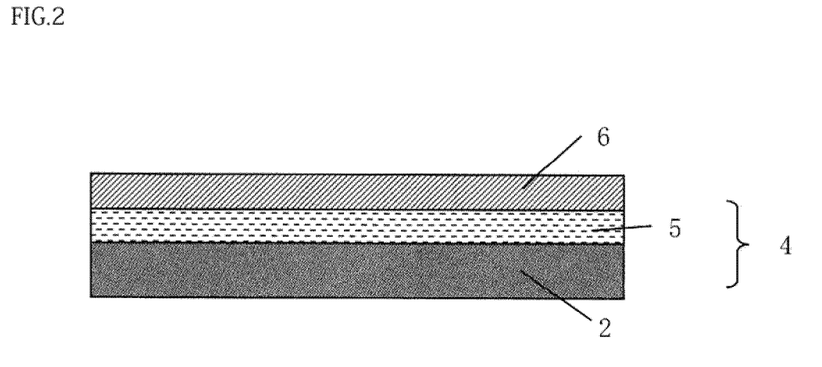
FIG. 2 is a schematic sectional view of a sheet material according to a second embodiment of the invention.

FIG. 2 is a schematic sectional view of a sheet material according to a second embodiment of the invention. A sheet material 4 shown in FIG. 2 is one wherein a fine fiber layer 5 and a moisture-retaining layer 4 are formed on at least one surface of a substrate 2 in this order. In this case, some laminate may be formed between the substrate 2 and the fine fiber layer 5. In addition, some laminate may be formed on a surface opposite to the surface of the moisture-retaining layer 6, below which the fine fiber layer 5 has been formed. Moreover, some laminate may be formed on a surface opposite to the surface of the substrate on which the fine fiber layer has been formed. For example, a fine fiber layer may be formed on that surface.

Figure 3:
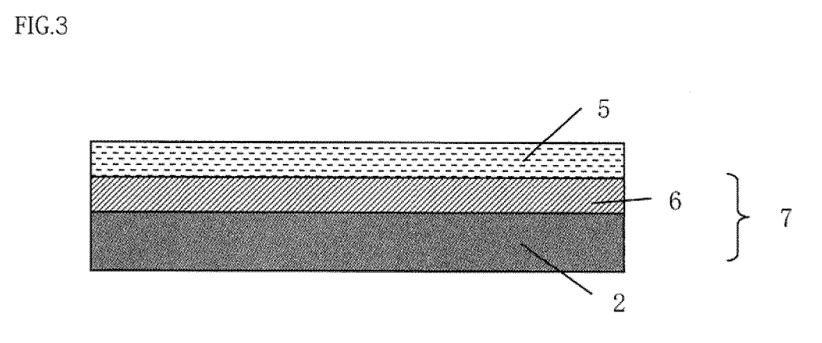
FIG. 3 is a schematic sectional view of a sheet material according to a third embodiment of the invention.

FIG. 3 is a schematic sectional view of a sheet material according to a third embodiment of the invention. A sheet material 7 shown in FIG. 3 is one wherein a moisture-retaining layer 6 and a fine fiber layer 5 are formed on at least one surface of a substrate 2 in this order. Here, some laminate may be formed between the substrate 2 and the moisture-retaining layer 6. Moreover, some laminate may be formed on a surface opposite to the surface of the fine fiber layer 5, below which the moisture-retaining layer 6 has been formed. Additionally, some laminate may be formed on a surface opposite to the surface of the substrate 2, on which the moisture-retaining layer has been formed. For example, a fine fiber layer may be formed.

Next, the configurations of the respective layers of the sheet materials 1, 4 7 are described in detail.

Configurations of the Respective Layers

<Substrate 2>

Although the substrate 2 used in the sheet materials of the respective embodiments are not specifically limited in type, paper is preferred from the aspect of environment. Moreover, the use of woven fabrics, non-woven fabrics and porous membranes is favorable since it can be expected to impart various functions due to their great specific surface area and the presence of fine pores. More particularly, when using substrates made of these papers, woven fabrics, non-woven fabrics and porous membranes, which do not have a flat surface profile and which are susceptible to troubles inherently involved in fabrication processes, such as of soaking, wetting and drying during the coating of a coating agent, the advantage of the sheet materials of the respective embodiments is further shown.

In order to improve the capability of forming the fine fiber layers 3, 5 or humectant 6 on the substrate 2, the substrate 2 may be subjected to surface treatment to impart wettability or an anchoring effect. Although no specific limitation is placed on the surface treatment, modification with a corona discharge treatment, a plasma treatment, UV irradiation, an alkali surface treatment and the like is preferred in view of the concept of the sheet materials related to the respective embodiments, costs and process simplification.

<Fine Fiber Layers 3, 5>

The starting fine fibers for the fine fiber layers 3, 5 used in the sheet materials of the respective embodiments include, for example, cellulose, chitin, chitosan and the like. Of these, cellulose fibers are preferred because of their regular structural arrangement and rigid skeleton. Usable celluloses serving as a starting material of the cellulose fibers include, for example, wood pulp, non-wood pulp, cotton, bacterial cellulose and the like. Although fibrillation methods for fine fibers are not specifically limited, mention is made, for example, of mechanical treatments with a high pressure homogenizer, an ultrasonic homogenizer, grinder crushing, frozen crushing, a media mill and the like. Any of the methods may be used. As a pre-step prior to the above mechanical treatment, chemical treatments may be carried out, for example. The arbitrary control of the degree of the mechanical or chemical treatment enables fine fibers having a desired fiber shape to be obtained. It will be noted that details of the chemical treatment are described hereinafter. The fine fibers contained in the fine fiber layers 3, 5 should preferably have high crystallinity. This is because the high crystallinity of fine fibers leads to improved gas barrier properties, physical strength, water resistance and thermal stability.

For the method of forming the fine fiber layers 3, 5, known methods can be used. For example, the fine fiber layers 3, 5 can be formed by coating a fine fiber dispersion containing fine fibers according to a variety of wet film-forming methods. More particularly, the methods of forming the fine fiber layers 3, 5 include those making use of a gravure coater, a dip coater, a reverse coater, a wire bar coater, a die coater, a spray coater and the like. Although the dispersion medium of the fine fiber dispersion is not specifically limited, water is preferred from the standpoints of the problem of working environment and the recovery of solvent. For the purposes of improving the fabrication steps involved in coatability, drying capability and the like and also improving the dispersibility and dispersion stability of fine fibers, the above solvent may be admixed with an organic solvent such as an alcohol. The concentration of the dispersion may be arbitrarily adjusted within a range of no problem in terms of the formation of desired fine fiber layers 3, 5.

With respect to the shape of the fine fibers contained in the fine fiber layers 3, 5, it is preferred that the width of the fine fibers (i.e. fiber width) is within a range of from 2 nm to 50 nm and the length of the fine fibers (i.e. fiber length) is within a range of from 0.2 μm to 50 μm. If the fiber width ranges from 2 nm to 50 nm, not only the fine fibers are optically transparent, so that the degree of freedom in product design is improved, but also the fine fibers can be formed as a dense film thereby showing good gas barrier properties. It is to be noted that where the fiber width is less than 2 nm, it may become difficult to keep the shape of the fibers in some cases. If the fiber width exceeds 50 nm, the optical transparency of the fine fibers may lower. If the fiber length is less than 0.2 μm, the mutual entanglement of the fine fibers is weak, with some cases that the strength of formed fine fiber layers 3, 5 becomes inadequate. Especially, where paper, a non-woven fabric or a porous membrane is used, the fine fibers may seep in the substrate, with some concern that the component functioned as a film lowers in yield, or film formation itself becomes difficult. Where the fiber length exceeds 50 μm, mutual entanglement of the fine fibers can become too strong, so that the fine fiber dispersion is increased in viscosity. This is liable to cause a problem of the surface profile of formed fine fiber layers 3, 5.

It will be noted that the shape of the fine fibers can be confirmed by developing a fine fiber dispersion prepared at a concentration of 0.0001-0.001 wt % such as on a smooth-surface mica sheet, followed by drying and SEM (Scanning Electron Microscope) or AFM (Atomic Force Microscope) observation.

Further, the fine fiber layers 3, 5 are preferably formed as a cross-linked structure by use of a crosslinking agent from the standpoint of water resistance. The crosslinking agents include, for example, oxazoline, divinyl sulfone, a carbodiimide, hydrazine, a dihydrazide, epichlorohydrin and the like. These crosslinking agents may be used singly or in combination of two or more.

<Humectant>

It is preferred that the sheet materials of the respective embodiments contain a humectant in the fine fiber layer 3, or the fine fiber layer 5 and the moisture-retaining layer are provided adjacent to each other. This is described in detail.

Most of the fine fiber layers of the prior art are rigid and poor in flexibility. Accordingly, in the case where the fine fiber layer is formed, for example, on a substrate as a barrier layer, the gas barrier may be cracked when folded thereby causing the barrier properties to be deteriorated. Thus, a great restriction may be placed on product design. The main reason why the fine fiber layer shows rigidity or low flexibility resides in that fine fibers, particularly, cellulose fibers, have a multitude of hydroxyl groups contained in the molecules thereof, by which hydrogen bonds are formed intermolecularly and among molecular chains and densely packed. Accordingly, when a humectant is contained in the fine fiber layer 3 or when the moisture-retaining layer 6 is brought into close contact with the fine fiber layer 5, much more water molecules are taken in the fine fiber layer so that water molecules are arranged between the fibers thereby enabling the formation of the hydrogen bonds to be reduced. In this way, the gas barrier layers made of the fine fiber layers 3, 5 can be remarkably improved in flexibility.

The humectant used in the sheet materials of the respective embodiments may be ones wherein when 1 g of a humectant on dry weight basis is soaked in 10 g of water or hot water under conditions of 25° C., no separation occurs between the humectant and water or hot water. Examples of the humectant include cellulose, cellulose derivatives, chitin, chitosan derivatives, starch, hyaluronic acid, alginic acid, gelatin, kaolin, dextrin, glycerine, polyglycerine, D-sorbitol, PVA and the like. In particular, glycerine and sorbitol are preferred because of their better or even excellent moisture retention and great effect on flexibility. The humectant used in the moisture-retaining layer 6 may contain one or more of the above-indicated humectants, or a combination of two or more.

The fine fiber layers 3, 5 may further contain a plasticizer component, aside from the humectant. When a plasticizer component is contained in the fine fiber layers 3, 5, the flexibility of the fine fiber layers 3, 5 serving as a gas barrier layer is further improved, resulting in an increased degree of freedom in product design. Examples of the plasticizer include phthalic ester plasticizers, epoxy plasticizers, polyester plasticizers, glycol plasticizers, and sugar alcohol plasticizers. Of these, glycol plasticizers or sugar alcohol plasticizers are preferred in view of the compatibility with a fine fiber dispersion and affinity for fine fibers.

Examples of the glycol plasticizer include glycerine, diglycerin, polyglycerine, diethylene glycol, triethylene glycol, polyethylene glycol and the like. Of these, glycerine or diglycerin is preferred from the standpoints of safety, heat resistance and gas barrier properties.

Examples of the sugar alcohol plasticizer include sorbitol, maltitol, xylitol, erythritol, lactitol and the like. The sugar alcohol is favorable because it enables flexibility to be improved while keeping high gas barrier properties.

The above glycol plasticizer and sugar alcohol plasticizer effectively acts also as a humectant to be used in the sheet materials of the respective embodiments. In this sense, where a glycol or sugar alcohol plasticizer is added to the fine fiber layers 3, 5, a high effect of improving the flexibility of the fine fiber layers 3, 5 is obtained by the action of both humectant and plasticizer.

The method of forming the fine fiber layer 3 containing a humectant is not specifically limited. For instance, the fine fiber layer 3 may be formed by coating of a humectant-containing, fine fiber dispersion prepared by adding a humectant to a fine fiber dispersion, or the fine fiber layer 3 may be formed by coating of a humectant-containing, fine fiber dispersion prepared by mixing a humectant dispersion dispersed with a dispersant with a fine fiber dispersion. Alternatively, a humectant dispersion may be coated after formation of a fine fiber layer. It will be noted that for the purposes of improving the dispersibility of a humectant in a dispersion medium and improving the humectant effect, various types of additives may be added.

Where the fine fiber layer 3 containing a humectant is formed, the weight of the humectant relative to the solid content by weight of a combination of fine fibers and the humectant is preferably within a range of from 1% to 30%. If the weight of the humectant added is larger than 30%, the resulting gas barrier properties considerably lower due to an increase in swelling with water molecules of the fine fibers and an increased dissolution/diffusion speed with the water molecules in the fine fibers. On the other hand, if the weight of the humectant added is less than 1%, the effect of the humectant is so low that an improvement in flexibility may not be observed. Where a plasticizer is contained in the fine fiber layer 3, a total weight with a humectant is preferably not large than 30%. If the weight of the addition exceeds 30%, gas barrier properties lower considerably, with some cases that an effect as a gas barrier material is reduced.

On the other hand, in the case where the fine fiber layer 5 and the moisture-retaining layer 6 are formed separately, the moisture-retaining layer 6 can be formed by use of known methods. For example, a humectant dispersion is coated by use of any of various wet film-forming methods to form a moisture-retaining layer 6. More particularly, as a method of forming the moisture-retaining layer 6, mention can be made of the use of a gravure coater, a dip coater, a reverse coater, a wire bar coater, a die coater, a spray coater and the like. Although the dispersion medium of the humectant dispersion is not specifically limited, water is preferred in view of working environment problems and the recovery of solvent. For the purposes of improving fabrication processes relating to coatability, drying performance and the like and also improving the dispersibility and dispersion stability of a humectant, an organic solvent such as, for example, an alcohol may be mixed with the dispersion medium. The concentration of the dispersion may be arbitrarily adjusted within a range where no problem is involved in the formation of a desired moisture retaining layer 6.

<Deposition Layer>

In the sheet materials of the respective embodiments, a deposition layer (not shown) can be formed by vacuum deposition so as to cover a surface of the substrate 2 on which the fine fiber layer 3 or 5 has been formed. As a deposition method of forming the deposition layer, mention can be made, for example, of physical vapor phase deposition (PVD) methods such as a vacuum film-forming method, a sputtering method, an ion-plating method and the like and chemical vapor phase deposition (CVD) method such as a plasma chemical vapor phase deposition method, a thermo-chemical vapor phase deposition method, an photochemical vapor phase deposition method and the like. In more details, a deposition layer of a metal oxide such as silicon oxide, aluminum oxide or the like, is formed on the sheet material of the respective embodiments according to these vacuum processes. Thus, the sheet material can be used in practice.

A preferred thickness of the deposition layer may differ depending on the purpose in end use of the sheet material and the film formulation of the deposition layer and is preferably within a range of several tens of angstroms— 5000 Å. If the deposition layer is thinner than several tens of angstroms, the continuity of the deposition layer is lost. If over 5000 Å, cracks are more liable to occur.

It will be noted that prior to the formation of the deposition layer, plasma treatment may be carried out so that moisture or dust is removed from the surface of the fine fiber layers 3, 5 and the smoothness and activation of the surface are promoted.

As stated above, when using the sheet material 1 wherein the fine fiber layer 3 containing a humectant is provided on at least one surface of the substrate 2, or the sheet materials 4, 7 wherein the fine fiber layer 5 and the moisture retaining layer 6 are stacked on at least one surface of the substrate 2, there can be fabricated a gas barrier packaging container having both good gas barrier properties and flexibility.

[Effect Based on Layer Configuration]

In the case where the fine fiber layer 5 and the moisture-retaining layer 6 are separately formed on the substrate 2 in the sheets of the respective embodiments, the moisture-retaining layer 6 and the fine fiber layer 5 may be formed in this order as viewed from the side of the substrate 2 (substrate 2/moisture-retaining layer 6/fine fiber layer 5=configuration I), or the fine fiber layer 5 and the moisture-retaining layer 6 may be formed in this order (substrate 2/fine fiber layer 5/moisture-retaining layer 6=configuration II). The configurations I and II having the layers stacked in such different orders as indicated above have different effects from each other. It will be noted that in both cases of the configurations I and II, the fine fiber layer 5 and the humectant-retaining layer 6 are preferably formed adjacent to each other.

With the case of the configuration I, not only the moisture-retaining layer 6 supplies water molecules to the fine fiber layer 5, but also the extension or compression stress exerted on the fine fiber layer 5 through the substrate 2 can be reduced by the buffering action of the moisture-retaining layer 6 thereby suppressing the distortion or cracking of fine fiber layer 5. On the other hand, with the configuration II, since the fine fiber layer 5 is disposed on the side of the substrate 2, a filling effect of suppressing soaking in the substrate 2 is shown due to the entanglement of the fine fibers, thereby enabling the component of the moisture-retaining layer 6 to be effectively utilized.

[Chemical Treatment of Fine Fibers]

Next, when the fine fibers used in the sheet materials of the respective embodiments are chemically treated and subsequently subjected to mechanical treatment, there can be obtained fine fibers of a desired shape at low energy. An instance of the chemical treatment in the case where cellulose is used for the fine fibers is described below.

As a method of chemically treating cellulose, there is proposed such a treating method wherein 2,2,6,6-tetramethyl-1-piperidinyloxy radicals (TEMPO) are used as a catalyst and an oxidant such as sodium hypochlorite or a bromide such as sodium bromide is added while adjusting the pH. When the hydroxyl group at the C6 position of cellulose is carboxylated according to this method, the electrostatic repulsion between mutual cellulose fibers is enhanced, resulting in swelling of the fibers. Hence, cellulose is nano-fibrillated by a mechanical treatment at a low energy charge and thus, an aqueous dispersion of the cellulose can be obtained. Moreover, when using this method, the molecular weight of the thus obtained cellulose nanofibers is suppressed from lowering, so that the resulting fine fiber layer has high physical strength.

The above-stated chemical treatment is carried out according to the following procedure.

Initially, nitroxyl radicals and sodium bromide are added to cellulose dispersed in water, followed by further addition of an aqueous sodium hypochlorite solution while agitating at room temperature to oxidize the cellulose. Sodium hydroxide was added during the oxidation reaction to control the pH of the reaction system at 10.5. At this time, the hydroxyl group at the C6 position on the cellulose fiber surface is oxidized into a carboxyl group, followed by washing well with water. The resulting fibrillated fibers of the cellulose are used as a constituent material of the fine fiber layers 3, 5.

It will be noted that usable oxidants include hypohalogenous acids or salts thereof, and halogenous acids or salts thereof, of which sodium hypochlorite is preferred. As a bromide, mention is made, for example, of lithium bromide, potassium, bromide, sodium bromide and the like, of which sodium bromide is preferred.

The cellulose nanofibers used in the fine fiber layers 3, 5 are so adjusted by the chemical treatment that the carboxyl group content, relative to the weight of the cellulose, is within a range of from 0.1 mmol/g to 3.0 mmol/g, preferably from 1.0 mmol/g to 3.0 mmol/g. The cellulose obtained in this way after the chemical treatment (i.e. cellulose nanofibers) readily undergoes fibrillation of fibers by mechanical treatment in water thereby obtaining a homogeneous dispersion. Accordingly, a homogeneous layer having a uniform film thickness can be formed on the substrate 2. When the fibrillation proceeds, the fiber size of the cellulose nanofibers is on the order of several nanometers. This fine fiber size enables the formation of a dense film as the fine fiber layers 3, 5, for which it is considered that high barrier properties are developed.

It will be noted that the amount of the carboxyl group present in cellulose can be calculated according to the following method. 0.2 g of chemically treated cellulose on dry weight basis is taken in a beaker, to which 80 ml of ion-exchanged water is added. 0.5 ml of a 0.01M sodium chloride aqueous solution is added to the solution, to which 0.1M hydrochloric acid is added while agitating to adjust the pH to 2.0 as a whole. Using an automatic titrator (AUT-701, made by DKK-Toa Corporation), a 0.1M sodium hydroxide aqueous solution is poured at 0.05 ml/30 seconds, followed by measuring a conductivity and a pH value in every 30 seconds and continuing the measurement until the pH reaches 11. The titration amount of sodium hydroxide is obtained from the thus obtained conductivity curve, from which a content of the carboxyl group is calculated.

Example 1

The fabrication of the sheet material having gas barrier properties according to the invention is described. In this regard, however, the present invention should not be construed as limited to these examples.

The materials used in the examples are shown below.
<Substrate: A>
Paper was used as a substrate in the examples.
Substrate A-1: commercially available high-quality paper (weight basis: 64 g/m2, surface roughness (Ra): 1.5 μm)
The surface roughness used was a mathematical average roughness (Ra) defined in JIS B 0601.
<Fine Fiber Layer: B>
Cellulose nanofibers was used as fine fibers used in the examples.
Fine fiber B-1: cellulose nanofibers having an average fiber length of 1.0 μm (solid concentration: 2 mass %)
Fine fiber B-2: cellulose nanofibers having an average fiber length of 0.1 μm (solid concentration: 2 mass %)
Cellulose nanofibers used as a constituent material of the fine fiber layer were obtained according to the method described below.
(1) Reagent/Material
Cellulose: bleached kraft pulp ("Machenzie" of Fletcher Challenge Canada Ltd.)
TEMPO: commercial product (98%, made by Wako Pure Chemical Industries, Ltd.)
Sodium hypochlorite: commercial product (Cl: 5%, made by Wako Pure Chemical Industries, Ltd.)
Sodium bromide: commercial product (made by Wako Pure Chemical Industries, Ltd.)
(2) Oxidation Reaction of Cellulose with TEMPO
10 g of bleached kraft pulp on dry weight basis and 500 ml of ion-exchanged water were charged into a 2 liters glass beaker and allowed to stand overnight to cause the pulp to be swollen. This was adjusted in temperature to 40.0° C. by use of a temperature controller water bath, to which 0.1 g of TEMPO and 1 g of sodium bromide were added and agitated to provide a pulp suspension. With further agitation, 5 mmol/g of sodium hypochlorite per unit mass of the cellulose was added. Moreover, an about 1M sodium hydroxide aqueous solution was added so that the pH of the pulp suspension was kept at about 10.5. Thereafter, the reaction was carried out for 120 minutes, followed by washing the pulp well with ion-exchanged water to obtain oxidized cellulose with TEMPO.
(3) Dispersion Treatment of TEMPO-Oxidized Cellulose
The thus obtained TEMPO-oxidized cellulose was adjusted in ion-exchanged water to have a given concentration, followed by fibrillation under agitation for 30 minutes by means of a mixer (Absolute Mill, 14,000 r.p.m., made by Osaka Chemical Co., Ltd.) to obtain a transparent cellulose nanofiber aqueous dispersion (with a solid concentration of 2 mass %)(fine fibers B-1). Moreover, the cellulose nanofiber aqueous dispersion was treated with an ultra-high pressure homogenizer (Servo Labo of Advanced Nano Technology Co., Ltd., 150 MP, 10 passes) (fine fibers B-2). The fine fibers B-1 and B-2 were each diluted to a solid concentration of 0.0001 mass % and developed on mica in a small amount and dried. Subsequently, the AFM observation of the fine fibers B-1 and B-2 revealed that average fiber lengths of ten fibers were 1.0 μm and 0.1 μm, respectively, and the fiber diameters (fiber widths) were both at 4 nm.
<Moisture-Retaining Layer: C>
Glycerine was used in the form of an aqueous solution as a humectant in the examples.
Humectant C-1: glycerine (solid concentration: 10 mass %, made by Sakamoto Yakuhin Kogyo Co., Ltd.)

<Plasticizer: D>

Sorbitol was used in the form of an aqueous solution as a plasticizer of the examples.

Plasticizer D-1: Sorbit (adjusted in solid concentration to 40 mass % and made by DSP Gokyo Food & Chemical Co., Ltd.

Examples 1, 2

The aqueous solution of the humectant C-1 was mixed with the fine fibers B-1 at formulation ratios indicated in Table 1 by adjusting the weight of the humectant C-1 relative to the total solid weight of the fine fibers B-1 and the humectant C-1. Thereafter, the mixed solutions were each coated onto the substrate A-1 by means of a coater bar and dried in a drying furnace at 120° C. for 20 minutes. In this way, 1.5 g/m2 of a fine fiber layer on the solid weight basis was formed to obtain sheet materials of Examples 1, 2.

Example 3

The aqueous solution of the humectant C-1 and the aqueous solution of the plasticizer D-1 were mixed with the fine fibers B-1 at a formulation ratio indicated in Table 1 by adjusting the weight of their addition relative to the total solid weight of the fine fibers B-1, and the humectant C-1 and the plasticizer D-1. Thereafter, the mixed solution was coated onto the substrate A-1 by means of a coater bar and dried in a drying furnace at 120° C. for 20 minutes. In this way, 1.5 g/m2 of a fine fiber layer on the solid weight basis was formed to obtain a sheet material of Example 3.

Comparative Example 1

In the same manner as in Example 1 except that the aqueous dispersion of the fine fibers B-1 was coated onto the substrate A-1 by means of a coater bar, a sheet material of Comparative Example 1 was obtained.

Comparative Examples 2, 3

The aqueous solution of the humectant C-1 was mixed with the fine fibers B-1 at a formulation ratio indicated in Table 1 by adjusting the weight of the addition of the humectant C-1 relative to the total solid weight of the fine fibers B-1 and the humectant C-1. Subsequent steps were carried out in the same manner as in Example 1 to obtain sheet materials of Comparative Examples 2, 3.

Example 4

The aqueous solution of the humectant C-1 was coated onto the substrate A-1 by means of a bar coater and dried in a drying furnace at 120° C. for 20 minutes. In this way, 0.8 g/m2 of a moisture-retaining layer C-1 on the solid weight basis was formed. Thereafter, additionally, an aqueous dispersion of the fine fibers B-1 was coated onto the moisture-retaining layer C-1 by means of a coater bar and dried in a drying furnace at 120° C. for 20 minutes. In this way, 1.5 g/m2 of a fine fiber layer on the solid weight basis was formed thereby obtaining a sheet material having a layer configuration of substrate A/moisture-retaining layer C/fine fiber layer B related to Example 4.

Example 5

In the same manner as in Example 4 except for the formation of substrate A/fine fiber layer B/moisture-retaining layer C in this order, a sheet material of Example 5 was obtained.

Example 6

The aqueous solution of the humectant C-1 was coated onto the substrate A-1 by means of a bar coater and dried in a drying furnace at 120° C. for 20 minutes. In this way, 0.8 g/m2 of a moisture-retaining layer C-1 on the solid weight basis was formed. Thereafter, a mixed solution, which was obtained by mixing the fine fibers B-1 and the plasticizer D-1 after a formulation ratio by weight of the plasticizer D-1 was adjusted to 20 weight % relative to the total solid weight of the fine fibers B-1 and the plasticizer D-1, was coated onto the moisture-retaining layer C-1 by means of a coater bar and dried in a drying furnace at 120° C. for 20 minutes. In this way, 1.5 g/m2 of a fine fiber layer on the solid weight basis was formed to obtain a sheet material having a layer configuration of substrate A/moisture-retaining layer C/plasticizer-containing fine fiber layer B2 related to Example 6.

Comparative Example 4

In the same manner as in Example 4 except that no fine fiber layer B was formed, a sheet material of Comparative Example 4 was obtained.

Comparative Example 5

In the same manner as in Example 5 except that no moisture-retaining layer C was formed, a sheet material of Comparative Example 5 was obtained.

Comparative Example 6

In the same manner as in Example 4 except that the fine fibers B-2 were used for the fine fiber layer B, a sheet material of Comparative Example 6 was obtained.

Comparative Example 7

In the same manner as in Example 5 except that the fine fibers B-2 were used for the fine fiber layer B, a sheet material of Comparative Example 7 was obtained.

Examples 7, Comparative Examples 8, 9

In the same manner as in Example 5, Comparative Example 4 and Comparative Example 5, sheet materials of Example 7, Comparative Example 8 and Comparative Example 9 were obtained, respectively. Thereafter, the respective sheets were formed thereon with an SiOx film having a cured film thickness of 50 nm by use of an electron beam heating vacuum deposition apparatus wherein silicon oxide was evaporated by heating under conditions of a pressure of $1.5 \times 10^{-2}$ Pa during film formation.

[Evaluation]

The respective sheets of Examples 1-7 and Comparative Examples 1-9 were subjected to measurement of an oxygen transmission rate and a water vapor transmission rate after and prior to a bending test. Moreover, the sheets of Examples 4-5 and Comparative Examples 4-7 were evaluated with respect to smell barrier properties.

<Oxygen Transmission Rate>

As to the sheet materials of Examples 1-6 and Comparative Examples 1-7, the oxygen transmission rate was measured by use of an oxygen transmission rate measuring device (Modern Control OXTRAN 10/50A) in an atmosphere of 30° C. and 40% RH. The sheets of Example 7 and Comparative Examples 8, 9 were subjected to measurement of the oxygen transmission rate by use of a similar device in an atmosphere of 30° C. and 70% RH. The results are shown in Tables 1 to 3.

<Water Vapor Transmission Rate>

As to the sheet materials of Examples 1-6 and Comparative Examples 1-7, the water vapor transmission rate was measured by use of a water vapor transmission rate measuring device (Modern Control PERMATRAN W6) in an atmosphere of 40° C. and 90% RH. The results are shown in Tables 1 to 3.

<Smell Barrier Properties>

As to the sheet materials of Examples 4-5 and Comparative

Examples 4-7, an organoleptic test making use of the principle of a cup method, in which anhydrous calcium chloride was placed in a water vapor transmission cup to measure a water vapor transmission rate, was carried out in such a way that menthol serving as a smell component was used instead of calcium chloride and kept in dry air for 2 days and whether the smell was emitted from the cup was organoleptically determined. The results are shown in Table 4. It will be noted that the organoleptic test was evaluated as indicated below.

◯: no smell felt x: smell felt

<Bending Test>

The respective sheets of Examples 1-7 and Comparative Examples 1-9 were each cut out into an A4 size and arranged by use of a paperweight in such a way that the substrate was turned outside, followed by conducting a bending test at a radius of curvature of 2 mm. The results are shown in Table 1 to 4.

It will be noted that "-" indicated at the column of "fiber length" in Tables 2-4 means that such a sheet is not provided with fine fiber layer B and thus, no corresponding fine fibers are present.

TABLE 1

|  | Component ratio | Formulation ratio | Oxygen transmission rate ($cc/m^2$-day-atm) | | Water vapor transmission rate ($g/m^2$-day) | |
| --- | --- | --- | --- | --- | --- | --- |
|  |  |  | Prior to bending | After bending | Prior to bending | After bending |
| Example 1 | (B)/(C) | 95/5 | 0.5 | 4.2 | 9.1 | 52 |
| Example 2 | (B)/(C) | 70/30 | 0.7 | 1.5 | 12 | 22 |
| Example 3 | (B)/(C)/(D) | 70/20/10 | 0.6 | 0.9 | 11 | 22 |
| Comparative Example 1 | (B) | 100 | 0.3 | 11 | 8.5 | >100 |
| Comparative Example 2 | (B)/(C) | 50/50 | 4.4 | 5.0 | 38 | 40 |
| Comparative Example 3 | (B)/(C) | 30/70 | 13 | 14 | >100 | >100 |

TABLE 2

|  | Configuration | Fiber length | Oxygen transmission rate ($cc/m^2$-day-atm) | | Water vapor transmission rate ($g/m^2$-day) | |
| --- | --- | --- | --- | --- | --- | --- |
|  |  |  | Prior to bending | After bending | Prior to bending | After bending |
| Example 4 | (A)/(C)/(B) | (B-1) | 0.2 | 0.3 | 8.2 | 10 |
| Example 5 | (A)/(B)/(C) | (B-1) | 0.2 | 0.2 | 7.6 | 8.8 |
| Example 6 | (A)/(C)/(B2) | (B-1) | 0.4 | 0.4 | 9.5 | 11 |
| Comparative Example 4 | (A)/(C) | — | 79 | >100 | >100 | >100 |
| Comparative Example 5 | (A)/(B) | (B-1) | 0.4 | 5.5 | 8.3 | 19 |
| Comparative Example 6 | (A)/(C)/(B) | (B-2) | 3.5 | 4.8 | 27 | 71 |
| Comparative Example 7 | (A)/(B)/(C) | (B-2) | 3.4 | 5.4 | 23 | 66 |

TABLE 3

| | Configuration | Fiber length | Thickness of deposition layer | Oxygen transmission rate (cc/m²-day-atm) | | Water vapor transmission rate (g/m²-day-atm) | |
|---|---|---|---|---|---|---|---|
| | | | | Prior to bending | After bending | Prior to bending | After bending |
| Example 7 | (A)/(B)/(C) | (B-1) | 50 | 0.2 | 0.2 | 1.5 | 1.7 |
| Comparative Example 8 | (A)/(C) | — | 50 | >100 | >100 | >100 | >100 |
| Comparative Example 9 | (A)/(B) | (B-1) | 50 | 0.2 | 45 | 1.5 | 6.1 |

TABLE 4

| | Configuration | Fiber length | Smell barrier properties | |
|---|---|---|---|---|
| | | | Prior to bending | After bending |
| Example 4 | (A)/(C)/(B) | (B-1) | ○ | ○ |
| Example 5 | (A)/(B)/(C) | (B-1) | ○ | ○ |
| Comparative Example 4 | (A)/(C) | — | X | X |
| Comparative Example 5 | (A)/(B) | (B-1) | ○ | ○ |
| Comparative Example 6 | (A)/(C)/(B) | (B-2) | ○ | X |
| Comparative Example 7 | (A)/(B)/(C) | (B-2) | ○ | X |

As shown in Tables 1-3, it has been confirmed that when the humectant is contained in the fine fiber layer or when the fine fiber layer and the moisture-retaining layer are stacked on one another, the gas barrier properties contributing to blocking oxygen or water vapor are improved, bending durability is improved, and flexibility is improved as well. As shown in Table 4, it has also been confirmed that the stacking of the fine fiber layer and the moisture-retaining layer on one another leads to improved smell barrier properties. The present invention has been described with reference to specific embodiments, which should not be construed as limiting the invention thereto. It will be obvious to those skilled in the art that modifications of the invention may be made along with many alterations of the embodiments of the invention with reference to the illustration of the invention. Accordingly, such alterations and modifications should be construed as embraced within the scope of the appended claims without departing from the spirit of the invention.

INDUSTRIAL APPLICABILITY

According to the invention, there can be fabricated gas barrier sheets, which make effective use of natural resource and which have improved or even excellent gas barrier properties including, aside from oxygen barrier properties, water vapor barrier properties and smell barrier properties and are improved or even excellent in flexibility as well, and also a barrier packaging container using the same.

REFERENCE SIGNS LIST

1: sheet material
2: substrate
3: humectant-containing fine fiber layer, or humectant and plasticizer-containing fine fiber layer
4: sheet material
5: fine fiber layer, or plasticizer-containing fine fiber layer
6: moisture-retaining layer
7: sheet material

What is claimed is:

1. A sheet material, comprising:
a substrate, a fine fiber layer on at least one surface of the substrate, and a moisture-retaining layer also on the at least one surface of the substrate, the fine fiber layer comprising a plasticizer and cellulose nanofibers having an average fiber length of about 1.0 μm, wherein the moisture retaining layer is formed by coating an aqueous solution of glycerine that does not contain nanofibers.

2. The sheet material of claim 1, wherein the fine fiber layer and the moisture-retaining layer are in direct contact with each other.

3. The sheet material of claim 1, wherein the moisture-retaining layer and the fine fiber layer are stacked on the substrate in this order.

4. The sheet material of claim 1, wherein the fine fiber layer and the moisture-retaining layer are stacked on the substrate in this order.

5. The sheet material of claim 1 wherein the fine fibers have a width within a range of from 2 nm to 50 nm.

6. The sheet material of claim 1, wherein the substrate is constituted of any of paper, a woven fabric, a nonwoven fabric and a porous membrane.

7. A barrier packaging material that is fabricated using the sheet material of claim 1.

* * * * *